(12) United States Patent
Lee et al.

(10) Patent No.: US 12,056,222 B2
(45) Date of Patent: Aug. 6, 2024

(54) DISPLAY DEVICE INCLUDING A FINGERPRINT SENSOR AND A METHOD OF DRIVING THE SAME

(71) Applicant: SAMSUNG DISPLAY CO., LTD., Yongin-si (KR)

(72) Inventors: Soon Gyu Lee, Yongin-si (KR); Jin Woo Kim, Yongin-si (KR); Jung Hak Kim, Yongin-si (KR); Jae Hyung Jo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/153,069

(22) Filed: Jan. 20, 2021

(65) Prior Publication Data
US 2021/0334495 A1 Oct. 28, 2021

(30) Foreign Application Priority Data

Apr. 23, 2020 (KR) .................. 10-2020-0049505

(51) Int. Cl.
*G06F 21/32* (2013.01)
*G06F 3/041* (2006.01)
(Continued)

(52) U.S. Cl.
CPC ............ *G06F 21/32* (2013.01); *G06F 3/0412* (2013.01); *G06F 3/044* (2013.01); *G06V 10/764* (2022.01);
(Continued)

(58) Field of Classification Search
CPC ................ G06F 3/0412; G06F 3/044; G06F 3/041–04897; G06F 21/32; G06F 3/04166–04186; G06F 1/32–3296; G06K 9/00026–00093; G06K 9/00073; G06K 9/0008; G06K 9/6264; G06K 9/00006–001; G06K 9/6273;
(Continued)

(56) References Cited

U.S. PATENT DOCUMENTS 6,002,787 A * 12/1999 Takhar .................. G07C 9/257
382/125
6,795,569 B1 9/2004 Setlak
(Continued)

FOREIGN PATENT DOCUMENTS

KR 10-1985658 6/2019

OTHER PUBLICATIONS

Navrit Kaur Johal, et al., "A Novel Method for Fingerprint Core Point Detection", International Journal of Scientific & Engineering Research, vol. 2, Issue 4, 2011, pp. 1-6.
Sharat Chikkerur, et al., "Impact of Singular Point Detection on Fingerprint Matching Performance", Fourth IEEE Workshop on Automatic Identification Advanced Technologies, 2005, 7 pages.

*Primary Examiner* — Amr A Awad
*Assistant Examiner* — Aaron Midkiff
(74) *Attorney, Agent, or Firm* — F. Chau & Associates, LLC

(57) ABSTRACT

A display device including: a display panel including a display area in which an image is displayed; and a fingerprint sensor disposed on a first surface of the display panel and including a sensing area for sensing a fingerprint of a user, wherein the display device is configured to authenticate the fingerprint of the user by using data for a portion of the sensing area.

12 Claims, 17 Drawing Sheets

(51) Int. Cl.
 *G06F 3/044* (2006.01)
 *G06V 10/764* (2022.01)
 *G06V 10/82* (2022.01)
 *G06V 40/12* (2022.01)
 *G06V 40/13* (2022.01)

(52) U.S. Cl.
 CPC .......... *G06V 10/82* (2022.01); *G06V 40/1306* (2022.01); *G06V 40/1365* (2022.01); *G06V 40/1376* (2022.01)

(58) Field of Classification Search
 CPC ............... G06V 10/82; G06V 40/1335; G06V 40/12–1324; G06V 40/1365–1376; G06V 40/1347–1394
 See application file for complete search history.

(56) References Cited

U.S. PATENT DOCUMENTS

| | | | |
|---|---|---|---|
| 7,236,617 B1 * | 6/2007 | Yau | G06K 9/00026 |
| | | | 382/125 |
| 9,514,352 B2 | 12/2016 | Setterberg et al. | |
| 9,990,532 B2 | 6/2018 | Lee et al. | |
| 2016/0180145 A1 * | 6/2016 | Setterberg | G06K 9/00926 |
| | | | 382/124 |
| 2018/0173981 A1 * | 6/2018 | Rosqvist | G06K 9/00026 |
| 2018/0314875 A1 * | 11/2018 | Zhang | G06V 40/1365 |
| 2018/0373361 A1 * | 12/2018 | Her | G06F 3/04184 |
| 2018/0373913 A1 * | 12/2018 | Panchawagh | G01S 7/52079 |
| 2019/0163951 A1 * | 5/2019 | Chang | G06K 9/00087 |

\* cited by examiner

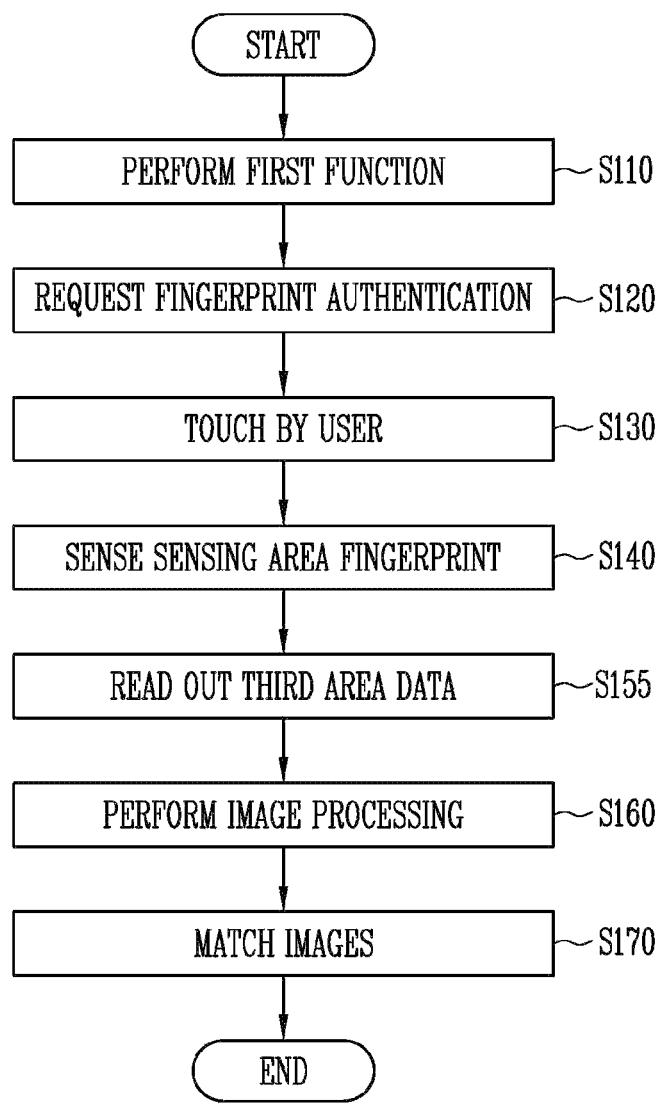

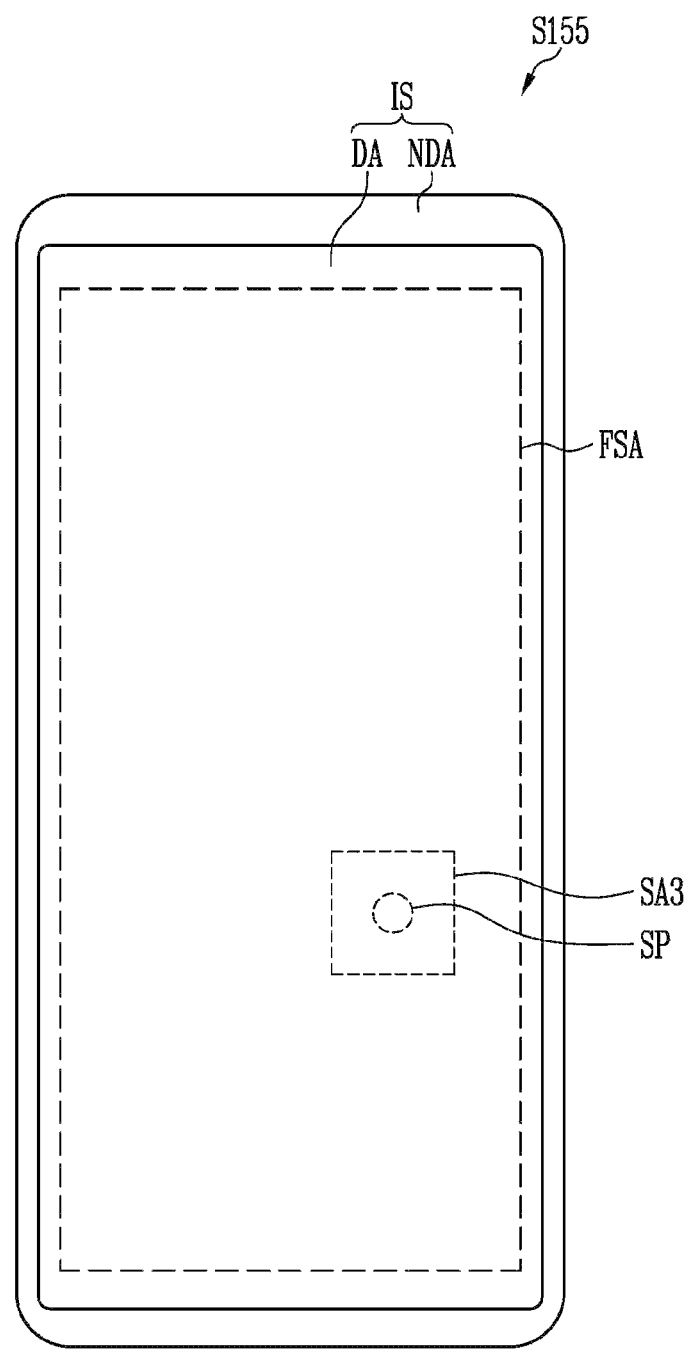

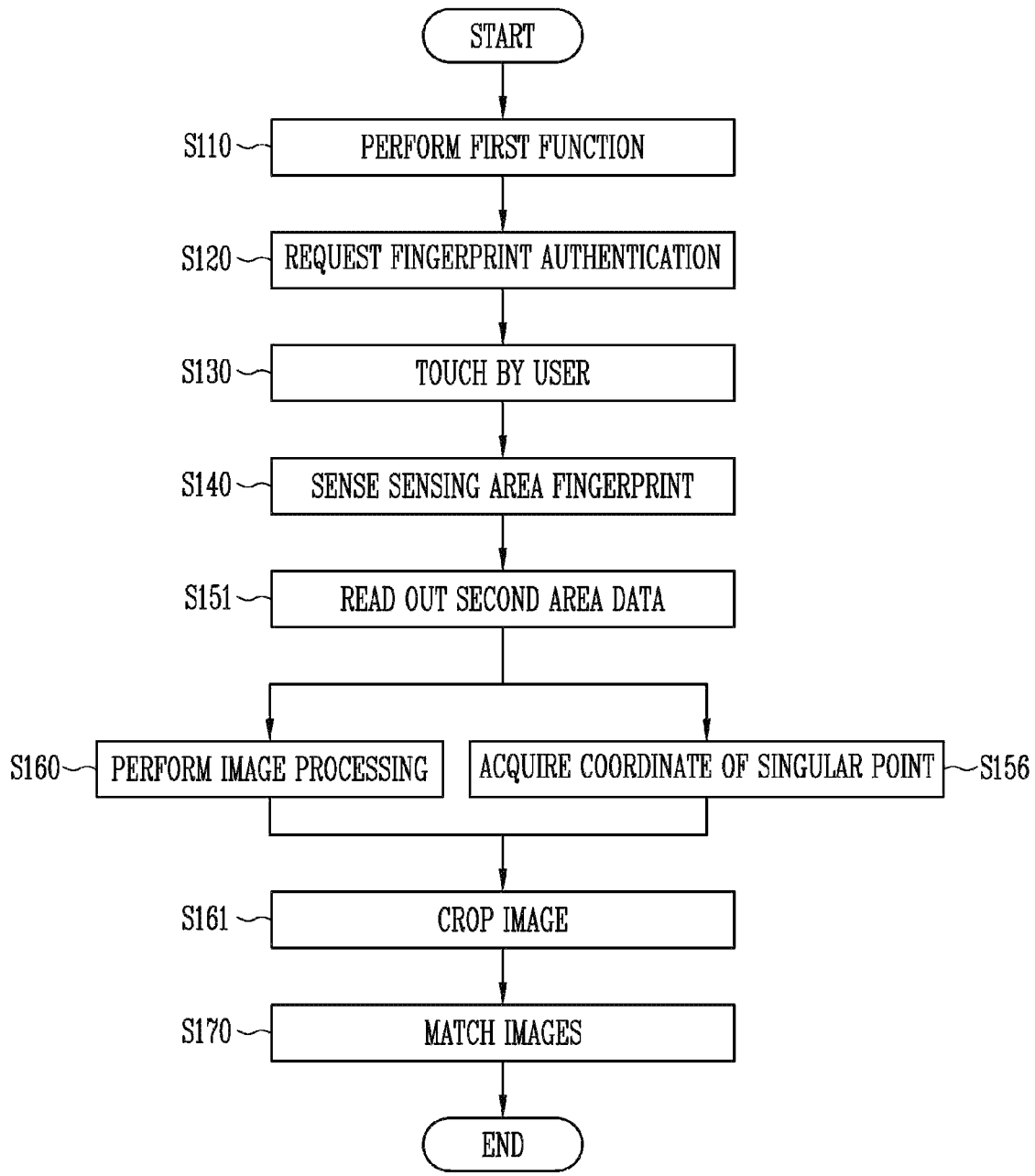

DISPLAY DEVICE INCLUDING A FINGERPRINT SENSOR AND A METHOD OF DRIVING THE SAME

CROSS-REFERENCE TO RELATED APPLICATION

The present application claims priority under 35 U.S.C. § 119 to Korean patent application number No. 10-2020-0049505 filed on Apr. 23, 2020, the disclosure of which is incorporated by reference herein in its entirety.

TECHNICAL FIELD

Exemplary embodiments of the present invention relate to a display device including a fingerprint sensor and a method of driving the display device.

DISCUSSION OF RELATED ART

Electronics devices employ authentication techniques as a security measure to protect stored information. Authentication is the process of identifying and verifying the identity of a system or person in a secure manner. In addition to traditional username and password, biometric information of users are being used for this security need.

The authentication techniques based on biometric information may include a process of acquiring biometric information, for example, fingerprints, an iris, voice, a face, blood vessels, and the like, from a user and a process of determining whether the user is an authorized user by comparing the acquired biometric information with previously registered biometric information of the user. Currently, fingerprint recognition is one of the most well known biometrics, and by far the most widely used biometric solution for authentication on computerized systems. The fingerprint recognition technique may strengthen the security of a user device, and may facilitate provision of various application services, such as mobile payments, and the like.

Display devices, such as smartphones and wearable devices in which a fingerprint sensor for sensing a fingerprint of a user is installed, are examples of widely used electronic devices with biometric authentication.

SUMMARY

According to an exemplary embodiment of the present invention, there is provided a display device including: a display panel including a display area in which an image is displayed; and a fingerprint sensor disposed on a first surface of the display panel and including a sensing area for sensing a fingerprint of a user, wherein the display device is configured to authenticate the fingerprint of the user by using data for a portion of the sensing area.

The sensing area may be included in the display area.

A size of the sensing area may be equal to or greater than 80% of a size of the display area.

The portion of the sensing area may correspond to a touch point where a finger of the user comes into contact with the display panel.

The display device may further include: a touch sensor configured to recognize a touch by the user.

The touch sensor may be disposed on a second surface of the display panel.

The portion of the sensing area may correspond to a singular point of the fingerprint.

The singular point may include a core, a delta, a ridge ending, a crossover, a bifurcation, or a pore.

The display device may be further configured to acquire coordinates of the singular point.

The coordinates of the singular point may be acquired using artificial intelligence (AI) technology.

The display device may be further configured to: read out data for a first area that is contacted by a finger of the user, and acquire data for a second area corresponding to a singular point of the fingerprint.

The second area may have a different size than the first area.

The display device may further include: a first memory for storing the data of the portion of the sensing area; and a second memory which stores previously obtained fingerprint information of the user.

The display device may further include a processor configured to match the data stored in the first memory with fingerprint information stored in the second memory.

According to an exemplary embodiment of the present invention, there is provided a method of driving a display device, the method including: performing a fingerprint sensing operation by sensing a sensing area contacted by a finger of a user with a fingerprint sensor included in the display device; generating data, at the fingerprint sensor, and providing the data to a read-out circuit, wherein the data is based on a sensing signal corresponding to a first area that is a portion of the sensing area; performing an image-processing operation on the data; and performing a matching operation in which an image processed by performing the image-processing operation is compared with a previously stored fingerprint image.

The first area may correspond to a touch point where the finger of the user comes into contact.

The method may further include: determining whether a singular point is included in the first area or whether a number of singular points equal to or greater than a reference number is included in the first area.

The method may further include: generating data based on a sensing signal corresponding to a second area corresponding to the singular point and transmitting the data based on the sensing signal corresponding to the second area to a memory.

The second area may be included in the first area.

The method may further include: acquiring coordinates of a singular point of the fingerprint of the user; and cropping the image processed by performing the image-processing operation based on the coordinates of the singular point.

According to an exemplary embodiment of the present invention, there is provided a display device including: a display panel including a display area in which an image is displayed; a fingerprint sensor disposed on the display panel and including a sensing area for sensing a fingerprint of a user; and a processor configured to authenticate the fingerprint of the user by using data read out from only a portion of the sensing area.

The portion of the sensing area may include a touch point that was contacted by a finger of the user.

According to an exemplary embodiment of the present invention, there is provided a display device including: a display panel including a display area in which an image is displayed; a fingerprint sensor disposed on the display panel and including a sensing area, wherein the fingerprint sensor is configured to sense a first portion of the sensing area contacted by a finger of a user, and generate data based on sensing signals corresponding to the first portion of the sensing area; and a processor configured to authenticate a fingerprint of the user by processing an image of the fingerprint of the user and comparing the processed image with a pre-stored fingerprint image.

The first portion of the sensing area may be smaller than the entire sensing area.

BRIEF DESCRIPTION OF THE DRAWINGS

FIG. 16 is a flowchart illustrating a method of driving a display device according to a further exemplary embodiment of the present invention.

FIG. 17 is a view illustrating a display device to describe the third area data read-out step in FIG. 16, according to an exemplary embodiment of the present invention.

FIG. 18 is a flowchart illustrating a method of driving a display device according to an exemplary embodiment of the present invention.

DETAILED DESCRIPTION OF THE EMBODIMENTS

Figure 1:
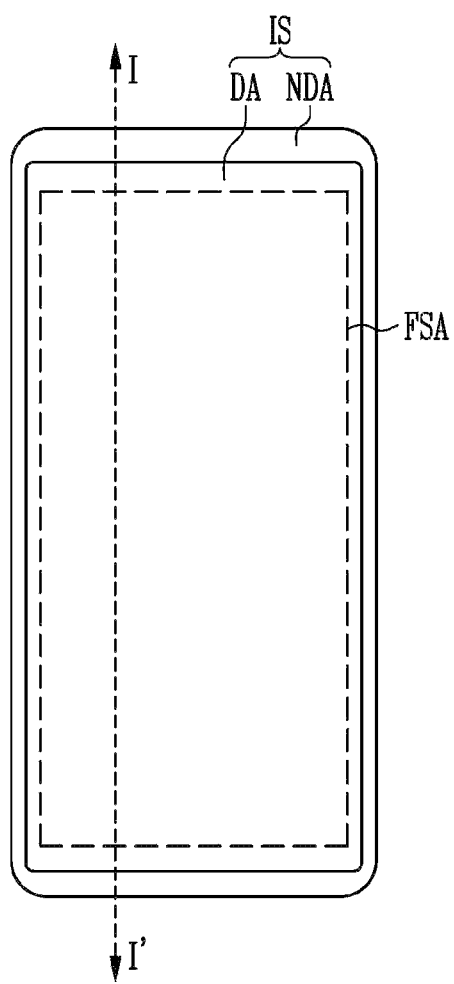
FIG. 1 is a top plan view schematically illustrating a display device according to an exemplary embodiment of the present invention.

Hereinafter, exemplary embodiments of the present invention will be described with reference to the accompanying drawings. However, the embodiments described herein may be implemented in various ways, and thus, should not be limited to the embodiments described herein.

A case where a first element or layer is designated as being disposed "on" a second element or layer may include cases where the first element or layer is disposed directly on the second element or layer or cases whether an additional element or layer is disposed between the first and second elements or layers.

In the present disclosure, the singular forms are intended to include the plural forms as well, unless the context clearly indicates otherwise.

The same or similar reference numerals may be used to designate the same components throughout the specification.

The size and thickness of each component shown in the drawings are shown for the convenience of description, and thus, the present invention is not limited thereto. For example, in the drawings, in order to clearly show a plurality of layers and regions, the thickness of the layers and regions may be exaggerated.

FIG. 1 is a top plan view schematically illustrating a display device according to an exemplary embodiment of the present invention.

Referring to FIG. 1, a display device 1 includes a display surface IS on which an image is displayed. The display surface IS may include a display area DA in which an image is displayed and a non-display area NDA that is adjacent to the display area DA. The non-display area NDA may surround the display area DA or be located on fewer than all sides of the display area DA.

The display area DA includes pixels, and may include a plurality of emission areas, each configured to emit a predetermined color of light. In addition, the display area DA may be used as a detection member for detecting an external environment (e.g., a touch or a fingerprint).

A sensing area FSA configured to recognize a fingerprint of a user may be provided in the display device 1. When the fingerprint surface of a finger of the user is touched on the sensing area FSA, the display device 1 may recognize the fingerprint by imaging the fingerprint touching the sensing area FSA.

In an exemplary embodiment of the present invention, the sensing area FSA may overlap at least a portion of the display area DA with respect to the plan positions thereof. For example, the sensing area FSA may be included in the display area DA. In other words, a part of the display area DA or all of the display area DA may overlap the sensing area FSA.

In an exemplary embodiment of the present invention, the size of the sensing area FSA may account for 80% or more of the size of the display area DA. In an exemplary embodiment of the present invention, the size of the sensing area FSA is equal to or less than the size of the display area DA, but may be equal to or greater than $15*15$ mm$^2$ (length*width).

The non-display area NDA is an area in which no image is displayed. The display area DA may have a rectangular shape. The non-display area NDA may surround the display area DA in a plan view. A speaker module, a camera module, a sensor module, and the like may be disposed in the non-display area NDA. In the alternative, these modules may not be disposed in the non-display area NDA. Here, the sensor module may include at least one of an illumination sensor, a proximity sensor, an infrared sensor, an ultrasonic sensor, and a view sensor.

However, the present invention is not limited thereto, and the shape of the display area DA and the shape of the non-display area NDA may be different from that shown in FIG. 1.

Figure 2:
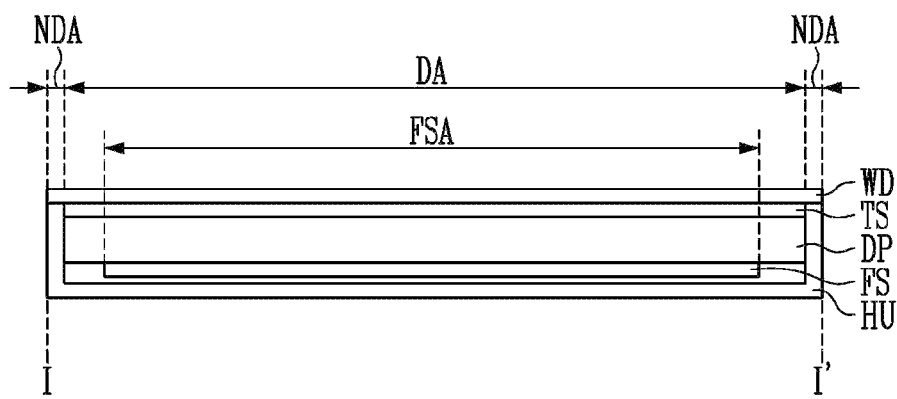
FIG. 2 is a schematic cross-sectional view of a display device taken along line I-I' of FIG. 1, according to an exemplary embodiment of the present invention.
Figure 3:
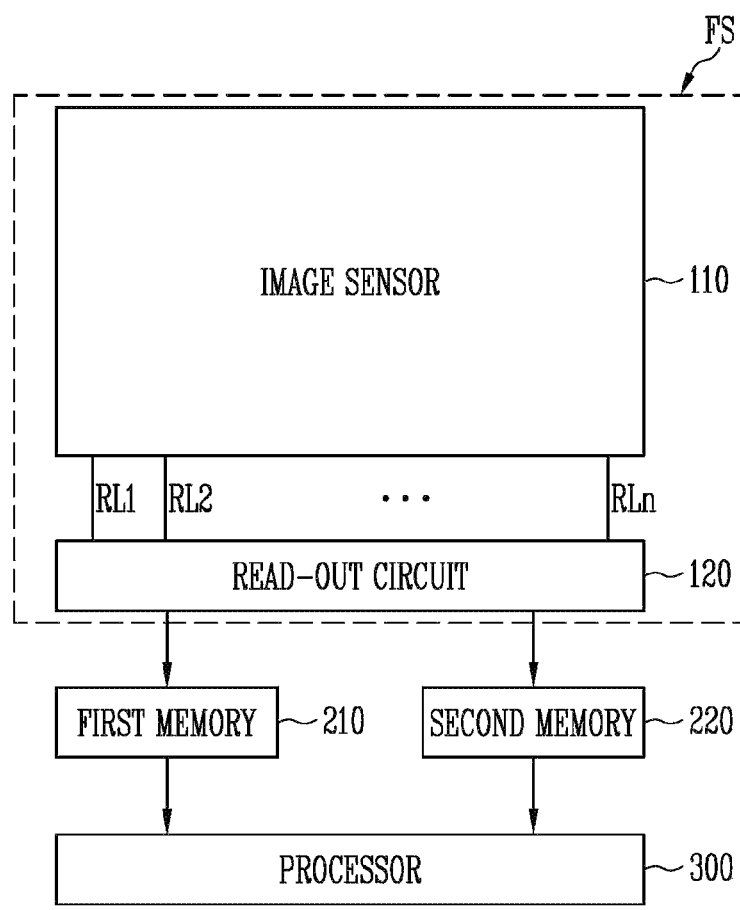
FIG. 3 is a block diagram for explaining the process of authenticating a fingerprint according to an exemplary embodiment of the present invention.

FIG. 2 is a schematic cross-sectional view of a display device taken along line I-I' of FIG. 1, according to an exemplary embodiment of the present invention. FIG. 3 is a block diagram for explaining the process of authenticating a fingerprint according to an exemplary embodiment of the present invention.

Hereinafter, when a first member is expressed as being disposed on the front surface of a second member, this may indicate that the first member is disposed (e.g., stacked) on the first surface of the second member, and when the first member is expressed as being disposed on the back surface of the second member, this may indicate that the first member is disposed on the second surface of the second member, the second surface being opposite to the first surface. In other words, disposing the first member on the front surface and disposing the first member on the back surface may be understood as disposing the first member in opposite directions with respect to the second member.

Referring to FIG. 2, the display device 1 includes a display panel DP, a touch sensor TS, a fingerprint sensor FS, a window member WD, and a housing member HU.

The display device 1 may further include a plurality of memories 210 and 220 and a processor 300 (as shown in FIG. 3). In an exemplary embodiment of the present invention, the plurality of memories 210 and 220 and the processor 300 may be in the form of a chip to be mounted on the display panel DP or the fingerprint sensor FS.

The display panel DP may be any of various types of display panels, such as an organic light-emitting display panel, a liquid crystal display panel, a field emission display panel, an electrophoretic display panel, a quantum dot emission display panel, and a micro (or nano) LED display panel.

The display panel DP may include a plurality of transistors and a plurality of light-emitting elements. At least one transistor and at least one light-emitting element may form a pixel.

The display panel DP may form the above-described display area DA.

In an exemplary embodiment of the present invention, the touch sensor TS may be disposed on the front surface of the display panel DP. For example, the touch sensor TS may be disposed on the first surface of the display panel DP. The touch sensor TS may include a plurality of sensing electrodes. The sensing electrodes may sense a touch, hovering, a gesture, proximity, and the like by a body part of a user. The sensing electrodes may be configured in different forms depending on various types, such as a resistive type, a capacitive type, an electromagnetic type, an optical type, and the like. For example, when the sensing electrodes are configured as a capacitive type, the sensing electrodes may be configured as a self-capacitive type, a mutual-capacitive type, or the like.

In some exemplary embodiments of the present invention, when the sensing electrodes are configured as a self-capacitive type, the respective sensing electrodes are individually driven, and sensing signals corresponding to a capacitance formed by the respective sensing electrodes and a body of a user may be provided to corresponding ones of coupling lines.

In different exemplary embodiments of the present invention, when the sensing electrodes are configured as a mutual-capacitive type, a touch-driving signal may be received through a coupling line corresponding to a first sensing electrode, and a touch-sensing signal may be transmitted through a coupling line corresponding to a second sensing electrode that forms mutual capacitance with the first sensing electrode. When the body of the user comes closer to the front surface of the display panel DP, the mutual capacitance between the first sensing electrode and the second sensing electrode may change, thereby causing a difference in a sensing signal, which is indicative of the user making contact with the display panel DP.

In an exemplary embodiment of the present invention, the fingerprint sensor FS may be disposed on the back surface of the display panel DP. For example, the fingerprint sensor FS may be disposed on the second surface of the display panel DP, the second surface of the display panel DP being opposite the first surface of the display panel DP. However, the present invention is not limited to the position of the fingerprint sensor FS. In an exemplary embodiment of the present invention, the fingerprint sensor FS may be disposed on another surface of the display panel DP.

The fingerprint sensor FS may form the above-described sensing area FSA.

Additionally referring to FIG. 3, in an exemplary embodiment of the present invention, the fingerprint sensor FS may sense light that is emitted from a light-emitting element and reflected from a valley between ridges of a fingerprint through an image sensor 110 included in the fingerprint sensor FS. Here, the image sensor 110 may be an optical fingerprint sensor. In addition, without limitation thereto, the image sensor 110 may be an ultrasonic image sensor, an infrared image sensor, or a capacitive fingerprint image sensor.

The fingerprint sensor FS may be a semiconductor chip or a semiconductor package, and may be attached to the back surface of the display panel DP. For example, the image sensor 110 may be a semiconductor chip or a semiconductor layer in which a plurality of photoelectric transformation elements (e.g., a photodiode, a phototransistor, a photogate, a pinned photodiode, and the like) are formed. In an exemplary embodiment of the present invention, the image sensor 110 may be a semiconductor layer, such as a complementary metal-oxide-semiconductor (CMOS) Image Sensor (CIS) or a Charge Coupled Device (CCD).

The fingerprint sensor FS includes a plurality of sensing pixels, and each of the sensing pixels senses light reflected from a different region in a fingerprint and generates an electrical signal corresponding to the sensed light. Each of the sensing pixels may generate an electrical signal corresponding to light reflected from a ridge in a fingerprint, or may generate an electrical signal corresponding to light reflected from a valley between ridges in the fingerprint. The amount of light sensed by the image sensor 110 may vary depending on the shape of the fingerprint from which light is reflected, and an electrical signal (e.g., a sensing signal) having a different level depending on the amount of sensed light may be generated. In other words, electrical signals from the plurality of sensing pixels may include brightness information (or image information). As such, the region corresponding to each of the sensing pixels may be determined to be a ridge or a valley through a processing operation for the electrical signal, and the entire fingerprint image may be formed by combining the determined ridge and valley information.

In an optical sensing method, fingerprint information may be acquired using light that is emitted from a plurality of pixels of the display panel DP and reflected from a fingerprint. Depending on the method of driving the display panel DP, the accuracy of light information acquired by the fingerprint sensor FS and the acquisition speed may vary.

The fingerprint sensor FS may include a read-out circuit 120 coupled to the image sensor 110 through read-out lines RL1, RL2, and RLn. The read-out circuit 120 may scan sensing signals through the read-out lines RL1, RL2, and RLn. Here, n is a natural number.

The read-out circuit 120 may generate sensing data based on the sensing signal and transmit the same to the first memory 210 or the second memory 220 disposed outside the fingerprint sensor FS. The sensing data may be converted into fingerprint data through image processing.

Each of the first memory 210 and the second memory 220 may store one or more pieces of fingerprint data. For example, the first memory 210 may store previously registered fingerprint information of a user, and the second memory 220 may store fingerprint data that is acquired from the fingerprint sensor FS when the process of authenticating a fingerprint is performed.

Each of the first and second memories 210 and 220 may be at least one of storage media, such as a cache, a nonvolatile memory element, such as a Read-Only Memory (ROM), a Programmable ROM (PROM), an Erasable Programmable ROM (EPROM), an Electrically Erasable Programmable ROM (EEPROM), or a flash memory, a volatile memory element, such as a Random-Access Memory (RAM), and a Hard Disk Drive (HDD), but is not limited to these examples.

The processor 300 may include a function to match fingerprint information stored in the first memory 210 with fingerprint information stored in the second memory 220. The processor 300 may be a Central Processing Unit (CPU), a Graphics Processing Unit (GPU), an Application Processor (AP), a Display Digital Interface (DDI), a display driver integrated circuit (IC), or the like, but is not limited thereto.

The processor 300 and the first and second memories 210 and 220 may be a single chip, or may be individual chips. In addition, the present invention is not limited to two memories, and the first memory 210 and the second memory 220 may be a single memory that performs the functions of each of the first and second memories 210 and 220.

The housing member HU forms the back surface and the edge surface of the display device 1, and the window member WD may form the front surface of the display device 1. The housing member HU and the window member WD may cover the display panel DP, the touch sensor TS, and the fingerprint sensor FS. For example, the touch sensor TS, the display panel DP and the fingerprint sensor FS may be disposed in the housing member HU. The housing member HU and the window member WD may protect various components of the display device 1 from external physical shocks (e.g., scratches) and the like. The window member WD may be the place where an input means, such as a finger of a user, or the like, comes into contact for actual sensing of a fingerprint.

The display area DA may overlap at least a portion of the display panel DP. In the present specification, the term "overlap" may indicate that two components overlap when viewed from the thickness direction of the display device 1.

The sensing area FSA may overlap at least a portion of the fingerprint sensor FS. As described above, the sensing area FSA may be included in the display area DA.

It is to be understood that a computer-readable storage medium for storing a computer program is also provided according to an exemplary embodiment of the present invention. The computer-readable storage medium stores a computer program that, when executed by the processor 300, causes the processor 300 to perform the image processing methods described above. The computer-readable recording medium is any data storage device that can store data read by a computer system. Examples of the computer-readable recording medium include RAM, ROM, etc. The computer-readable recording medium may be one of the first and second memories 210 and 220 or may be included within the processor 300.

Figure 4:
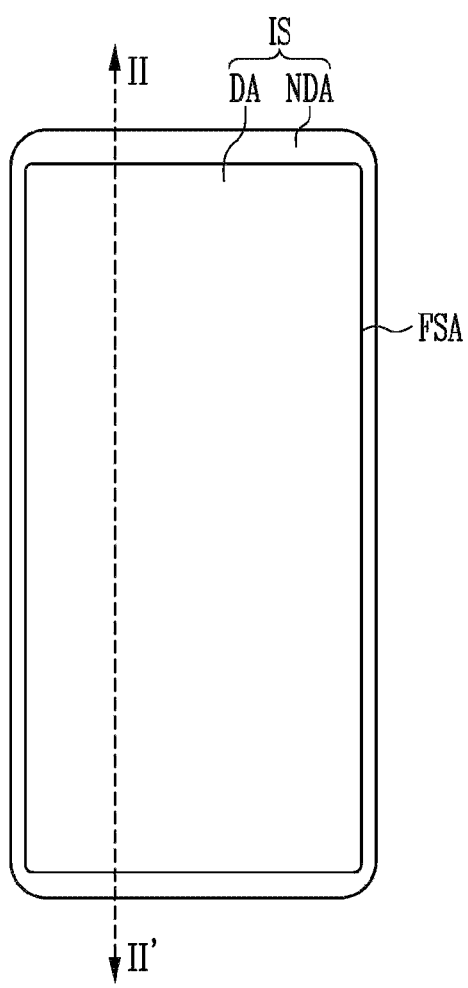
FIG. 4 is a top plan view schematically illustrating a display device according to an exemplary embodiment of the present invention.
Figure 5:
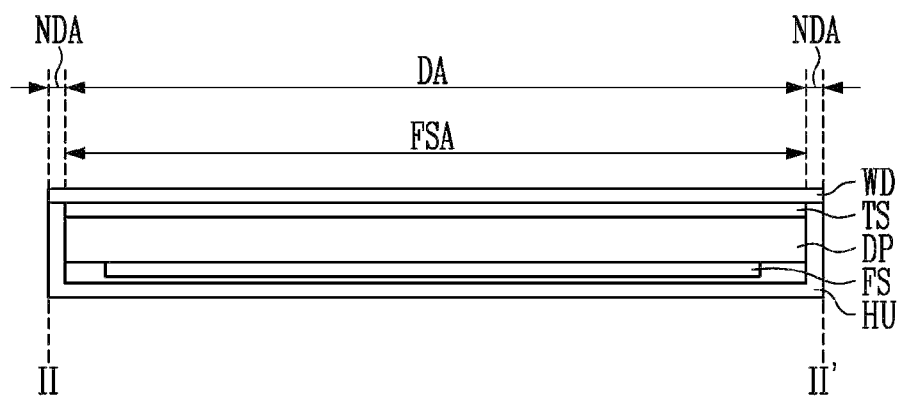
FIG. 5 is a schematic cross-sectional view of a display device taken along line II-II' of FIG. 4, according to an exemplary embodiment of the present invention.

FIG. 4 is a top plan view schematically illustrating a display device according to an exemplary embodiment of the present inventive concept. FIG. 5 is a schematic cross-sectional view of a display device taken along line II-II' of FIG. 4, according to an exemplary embodiment of the present invention.

Referring to FIG. 4 and FIG. 5, the display device 2 according to the present embodiment is different from the display device 1 according to the embodiment of FIG. 1 and FIG. 2 in that the sensing area FSA is set to the same area as the display area DA. In other words, in FIGS. 4 and 5, the sensing area FSA has the same location and size as the display area DA.

In the present embodiment, the size of the sensing area FSA may be the same as the size of the display area DA. In other words, when a user touches any region in the display area DA, which is the area for displaying an image, with his or her finger, the display device 2 not only recognizes the touch by the user but also senses the fingerprint of the user.

Because the functions of the respective members in the display device 2 and the positional relationships therebetween are similar to those of the members of the display device 1, a repeated description will be omitted.

Hereinafter, a method of driving a display device that includes a fingerprint authentication process will be described. In the driving method to be described below, the display device may be the display devices 1 and 2 described with reference to FIGS. 1 to 4.

Figure 6:
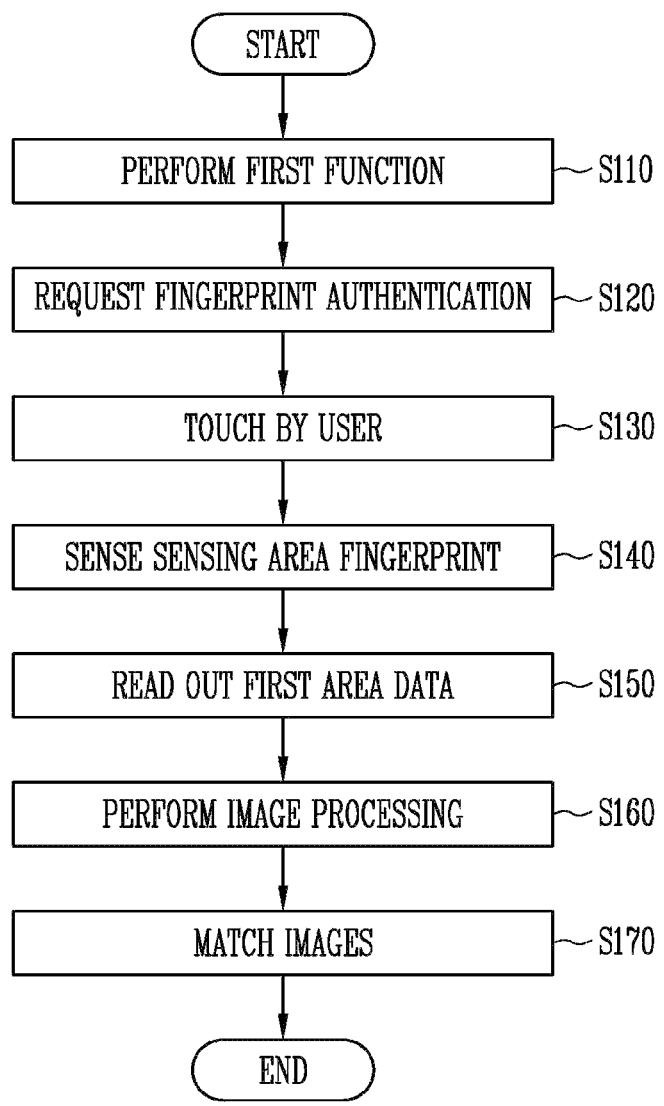
FIG. 6 is a flowchart illustrating a method of driving a display device according to an exemplary embodiment of the present invention.
Figure 7:
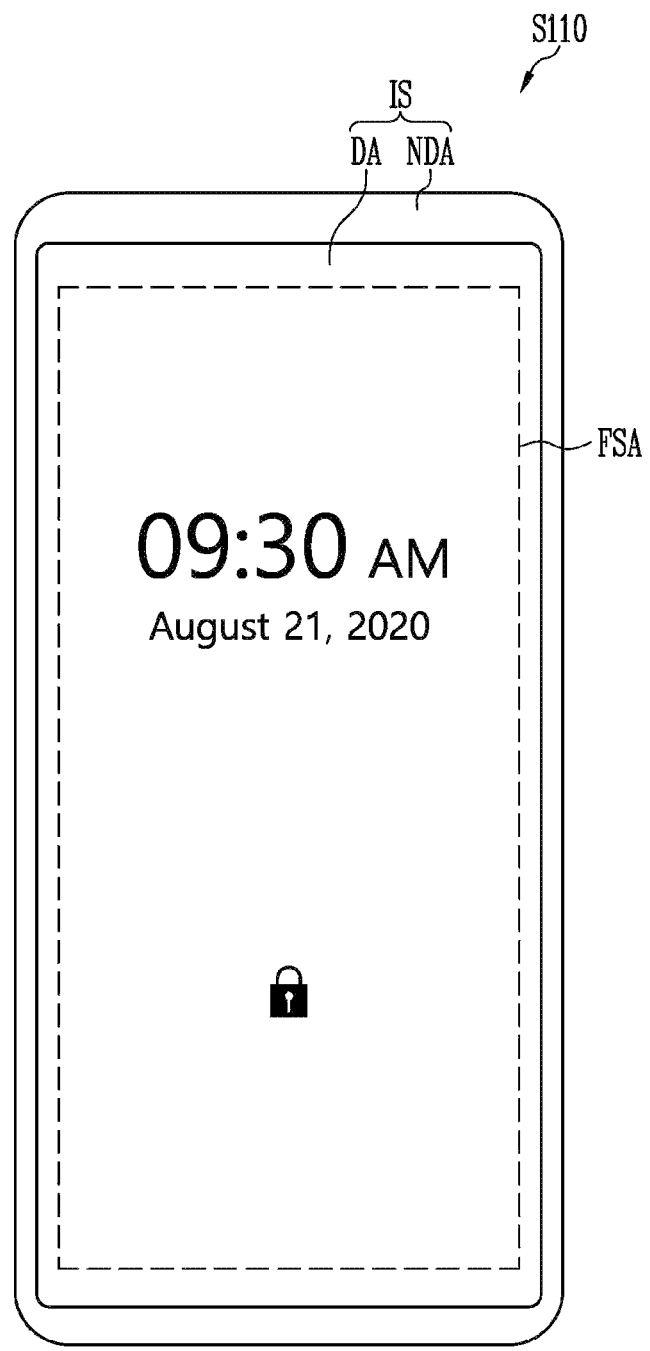
FIG. 7 is a view illustrating an example of a state in which the display device performs the first function step in FIG. 6, according to an exemplary embodiment of the present invention.
Figure 8:
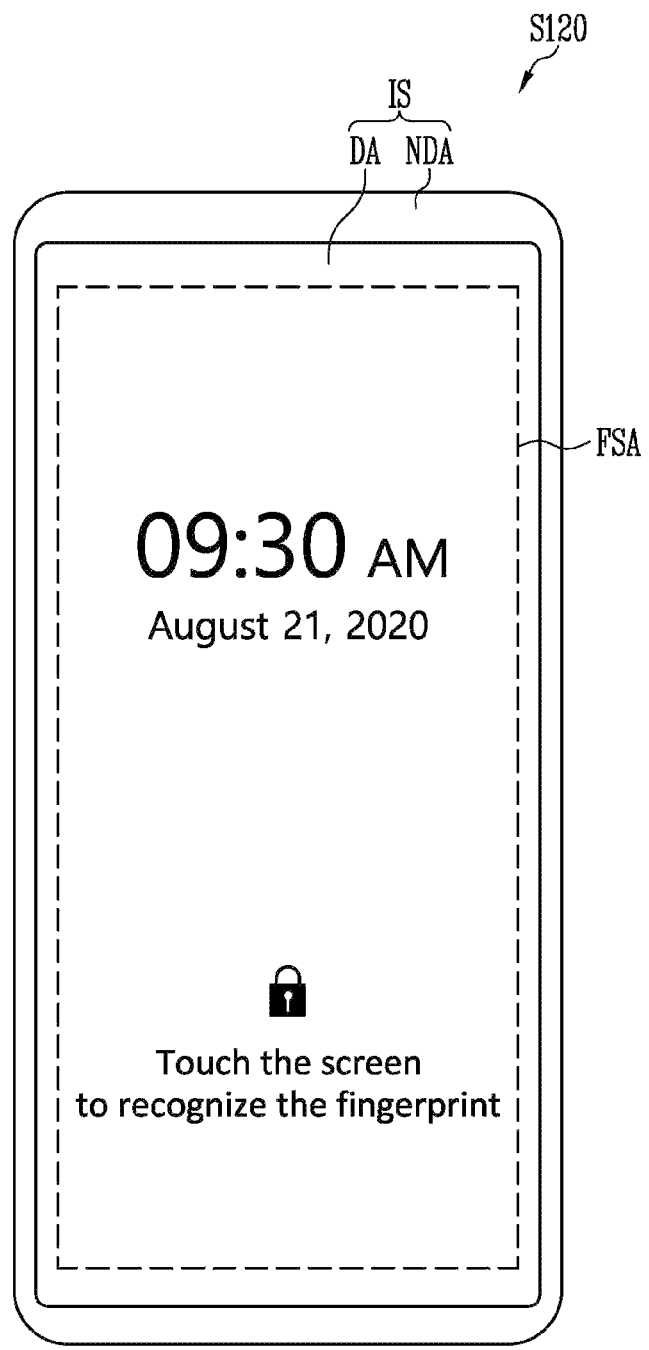
FIG. 8 is a view illustrating an example of a state in which the display device performs the fingerprint request step in FIG. 6, according to an exemplary embodiment of the present invention.
Figure 9:
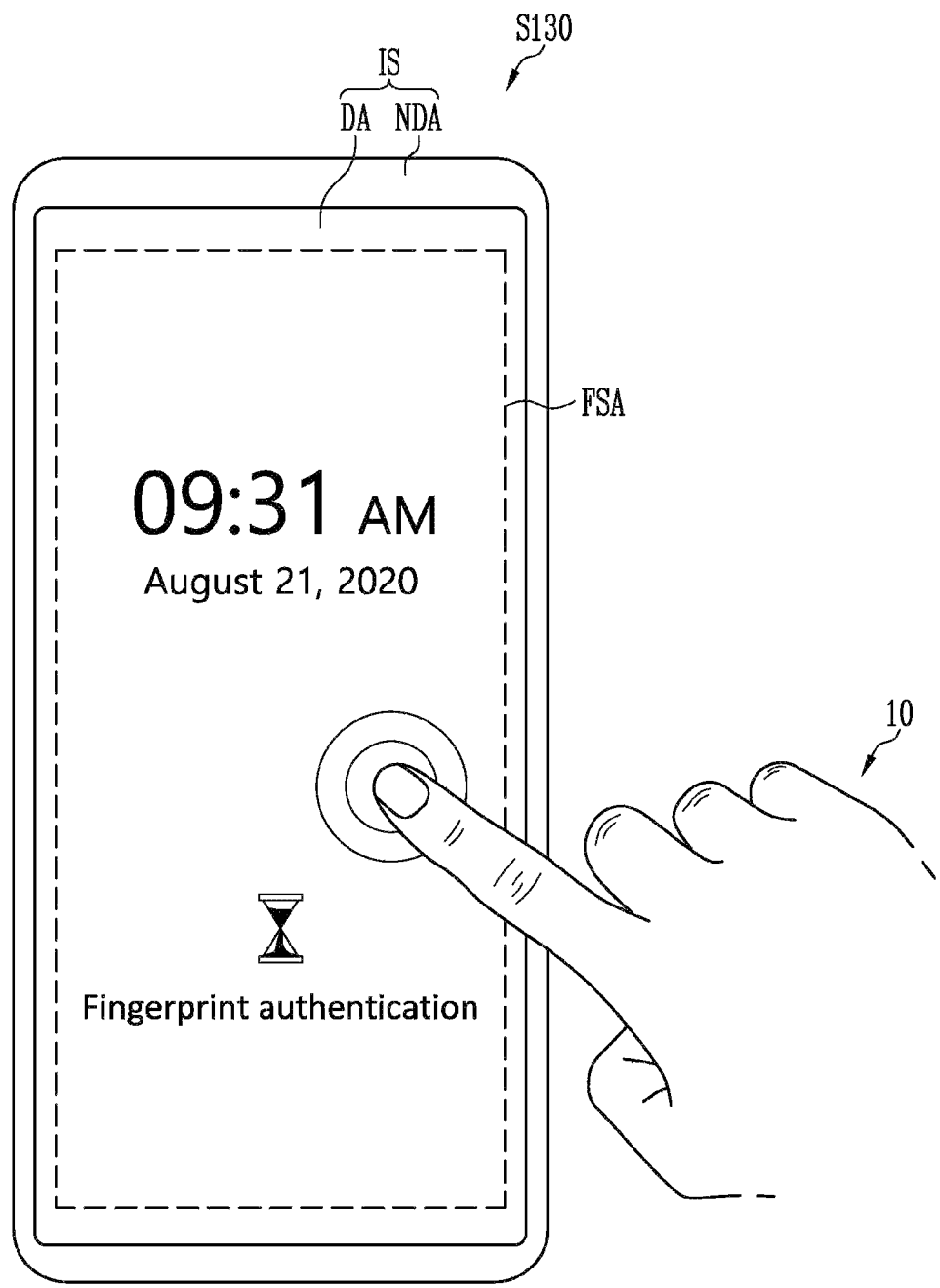
FIG. 9 is a view illustrating an example of a state in which a user touches a display device with a finger to describe the user touch step in FIG. 6, according to an exemplary embodiment of the present invention.
Figure 10:
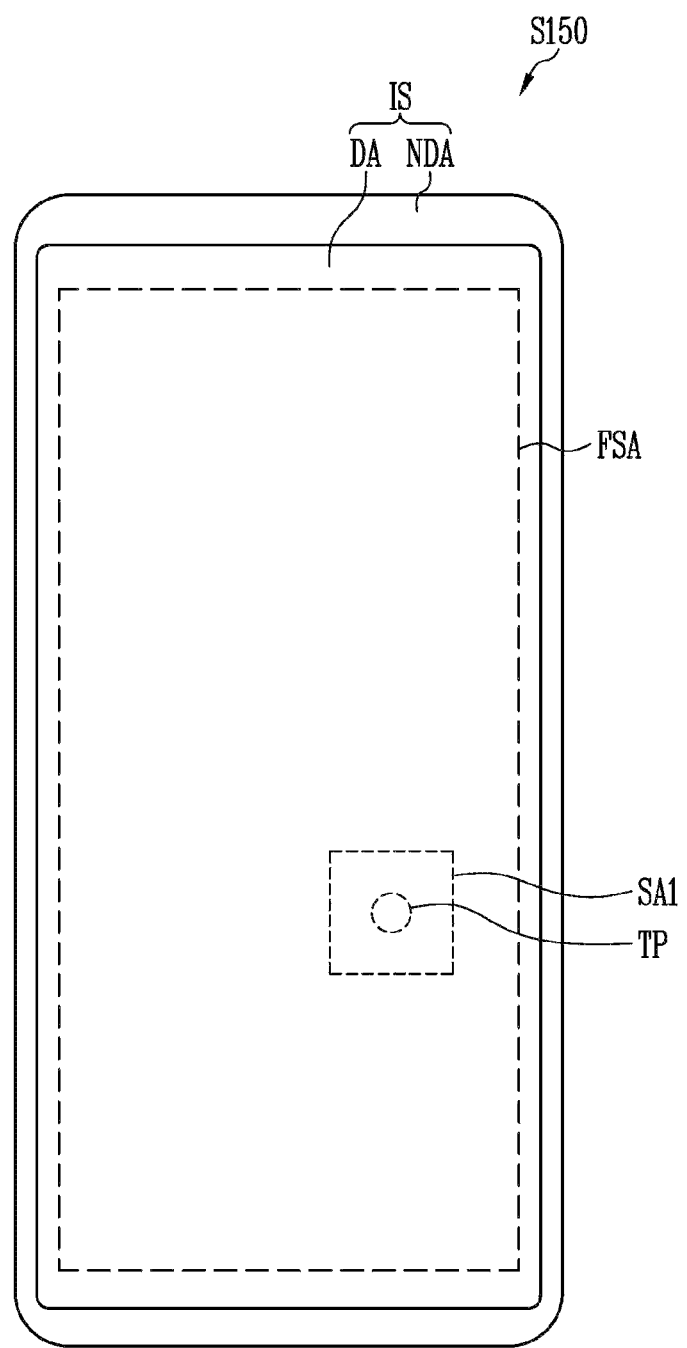
FIG. 10 is a view illustrating a display device to describe the first area data read-out step in FIG. 6, according to an exemplary embodiment of the present invention.

FIG. 6 is a flowchart illustrating a method of driving a display device according to an exemplary embodiment of the present invention. FIG. 7 is a view illustrating an example of a state in which a display device performs the first function step in FIG. 6, according to an exemplary embodiment of the present invention. FIG. 8 is a view illustrating an example of a state in which a display device performs the fingerprint request step in FIG. 6, according to an exemplary embodiment of the present invention. FIG. 9 is a view illustrating an example of a state in which a user touches a display device with his or her finger to describe the user touch step in FIG. 6, according to an exemplary embodiment of the present invention. FIG. 10 is a view illustrating a display device to describe the first area data read-out step in FIG. 6, according to an exemplary embodiment of the present invention.

Referring to FIG. 6, in an exemplary embodiment of the present invention, a method of driving a display device may include a first function performance step S110, a fingerprint authentication request step S120, a user touch step S130, a sensing area fingerprint sensing step S140, a first area data read-out step S150, an image-processing step S160, and a matching step S170. In the present embodiment, the steps are described as being performed sequentially according to the flowchart, but it is understood that the sequence of the steps can be changed, some of the steps can be omitted, or another step can be further included between the steps.

Additionally referring to FIG. 7, the first function performance step S110 corresponds to the step in which the display device performs a first function before an event that needs fingerprint authentication occurs. For example, the first function may correspond to a standby mode state of the display device (as shown in FIG. 7), a state in which the display device is locked with its screen off, or a state of the display device before a program that needs fingerprint authentication is run.

Additionally referring to FIG. 8, the fingerprint authentication request step S120 corresponds to the step in which, when the display device is performing the first function, an event requiring fingerprint recognition occurs in the display device. In this case, a user is prompted to touch the display device with a finger to authenticate a fingerprint. For example, in the case where the display area DA is in a display-on state, the display device may display a phrase, an image, or the like for prompting a user to touch the screen with a finger on the display screen. For example, as illustrated in FIG. 8, the phrase may be "Touch the screen to recognize the fingerprint".

Here, the fingerprint sensor FS may be activated to sense a fingerprint of the user. According to an exemplary embodiment of the present invention, when the fingerprint sensor FS is activated, the driving state of the pixels that overlap the sensing area FSA may be changed.

For example, when the display area DA is maintained in a display-on state before the fingerprint sensor FS is activated, the respective pixels of the display area DA may be driven at a first frequency. After the fingerprint sensor FS is activated, the pixels that overlap at least the sensing area FSA may be driven at a second frequency, which is different from the first frequency.

As an example, when the display area DA is maintained in a display-on state before the fingerprint sensor FS is activated, the respective pixels of the display area DA may be driven with a first luminance. After the fingerprint sensor FS is activated, the pixels that overlap at least the sensing area FSA may be driven with a second luminance, which is different from the first luminance.

Additionally referring to FIG. 9, the user touch step S130 corresponds to a state in which an input means comes into contact with the window member WD of the display device or is located very close thereto.

For example, the user touch step S130 may be the step in which a finger of the user comes into contact with one region of the window member WD that overlaps the sensing area FSA. When the finger 10 of the user comes into contact with the sensing area FSA of the display device, the content displayed on the screen of the display device is changed as illustrated, and the process of authenticating a fingerprint may be started. For example, the content displayed on the screen on the display device may be "Fingerprint authentication" which indicates that a fingerprint authentication process is underway. When the finger 10 of the user comes into contact with the outside of the sensing area FSA or when the sensing area FSA is not touched, the display device determines that the user does not want fingerprint recognition. In this case, the display device may return to the first function performance step S110 or the fingerprint authentication request step S120.

When the display device determines that a touch by the user is made within the sensing area FSA at the user touch step S130, the display device may perform the sensing area fingerprint sensing step S140. The sensing area fingerprint sensing step S140 corresponds to the step in which the fingerprint sensor FS included in the display device senses the sensing area FSA.

In an exemplary embodiment of the present invention, the fingerprint sensor FS may acquire sensing signals across the entire sensing area FSA through the image sensor 110 included therein.

The fingerprint sensor FS may read out data that is generated based on the acquired sensing signals.

Additionally referring to FIG. 10, the first area data read-out step S150 corresponds to the step in which the image sensor 110 generates data based on sensing signals corresponding to a first area SA1, among the sensing signals acquired across the entire sensing area FSA, and reads out the data to be provided to the read-out circuit 120.

The first area SA1 may correspond to a touch point TP where a touch by the user is made. For example, the first area SA1 may be larger than the touch point TP and encircle the touch point TP. In an exemplary embodiment of the present invention, the first area SA1 may include the touch point TP, and may have a smaller size than the sensing area FSA. According to an exemplary embodiment of the present invention, the first area SA1 may have a size that is equal to or less than the size of the actual area that was contacted by the finger of the user.

In an exemplary embodiment of the present invention, the fingerprint sensor FS may perform analog-to-digital conversion on the sensing signals corresponding to the first area SA1, and may transmit the digital signals, corresponding to the sensing signals of the first area SA1, to the first memory 210 or the second memory 220. In other words, the fingerprint sensor FS may convert the analog sensing signals to digital signals for transmission to the first memory 210 or the second memory 220. The first memory 210 or the second memory 220 may store the digital signals corresponding to the sensing signals of the first area SA1. The digital signals may include fingerprint feature information such as minutiae.

When the digital signals corresponding to the sensing signals of the first area SA1 are stored in the first memory 210 or the second memory 220, the image-processing step S160 may be performed.

The image-processing step S160 corresponds to the step in which the processor 300 processes an image based on the digital signals corresponding to the sensing signals of the first area SA1.

For example, image processing may include processing performed by the processor 300 to transform an image to grayscale based on the digital signals corresponding to the sensing signals of the first area SA1, and the like. The sensing area fingerprint sensing step S140 may include the process of forming a fingerprint image by setting the brightness or depth using light information that is input to the fingerprint sensor FS when a fingerprint is reflected from the screen of the display panel DP at the time of sensing the fingerprint.

As an example, image processing may include scaling, rotation and/or translation performed by the processor 300 on the image transformed based on the digital signals corresponding to the sensing signals of the first area SA1.

As another example, image processing may include converting, by the processor 300, the coordinate system of the frequency domain information included in the image transformed based on the digital signals corresponding to the sensing signals of the first area SA1 into a polar coordinate system using Log-Polar Transform (LPT). For example, the LPT may be performed on the magnitude value of a Fast Fourier Transform (FFT) image derived through FFT. For example, the FFT may be applied to the image to which the LPT is applied to obtain the FFT image. Then, the processor 300 performs phase correlation between images, thereby detecting a peak as the result of performing the phase correlation. The position of the detected peak may indicate rotation information or scale information pertaining to the image.

The matching step S170 corresponds to the step in which the processor 300 matches the image processed based on the digital signals corresponding to the sensing signals of the first area SA1 with an image containing the previously stored fingerprint information of the user. Hereinafter, the image processed based on the digital signals corresponding to the sensing signals of the first area SA1 may be referred to as the input fingerprint image and the image containing the previously stored fingerprint information of the user may be referred to as the registered fingerprint image.

In an exemplary embodiment of the present invention, the processor 300 may calculate the similarity between the registered feature information of the user's registered fingerprint image previously stored in the first memory 210 and the input feature information of the input fingerprint image stored in the second memory 220. For example, the feature information may include at least one of minutiae information, Scale-Invariant Feature Transform (SIFT) information, and phase information extracted based on a frequency domain conversion method.

According to an exemplary embodiment of the present invention, the size of the user's registered fingerprint image previously stored in the first memory 210 may be different from the size of the input fingerprint image stored in the second memory 220. For example, because the user's registered fingerprint image previously stored in the first memory 210 is generated based on the sensing area FSA and the input fingerprint image stored in the second memory 220 is generated based on the first area SA1, they may have different sizes.

For example, the processor 300 may calculate a score indicating the extent to which the input fingerprint image matches the registered fingerprint image based on the pattern similarity between the registered fingerprint image and the input fingerprint image and on the similarity between the feature information of the registered fingerprint image and the feature information of the input fingerprint image. However, the score may be based on just one of the pattern between the registered fingerprint image and the input fingerprint image, and the similarity between the feature information of the registered fingerprint image and the feature information of the input fingerprint image. The processor 300 may determine that authentication succeeds when the score is equal to or greater than a predetermined threshold, and may determine that authentication fails when the score is less than the predetermined threshold.

In the present embodiment, because steps from the image-processing step S160 to the matching step S170 are performed using the signals corresponding to the sensing signals of the first area SA1, which is a portion of the sensing area FSA, rather than the entire sensing area FSA, the processor 300 may quickly determine whether authentication succeeds, compared to when the steps S160 to S170 are performed using the signals corresponding to the sensing signals of the entire sensing area FSA.

According to an exemplary embodiment of the present invention shown in FIGS. 1-10, the display device 1 may include: a display panel DP including a display area DA in which an image is displayed; and a fingerprint sensor FS disposed on a first surface of the display panel DP and including a sensing area SA1 for sensing a fingerprint of a user, wherein the display device 1 is configured to authenticate the fingerprint of the user by using data for a portion of the sensing area SA1.

Next, a method of driving a display device according to an exemplary embodiment of the present invention will be described. Hereinafter, a description of components that are the same as the components in FIGS. 1 to 10 may be omitted, and the same or similar reference numbers may be used therefor.

Figure 11:
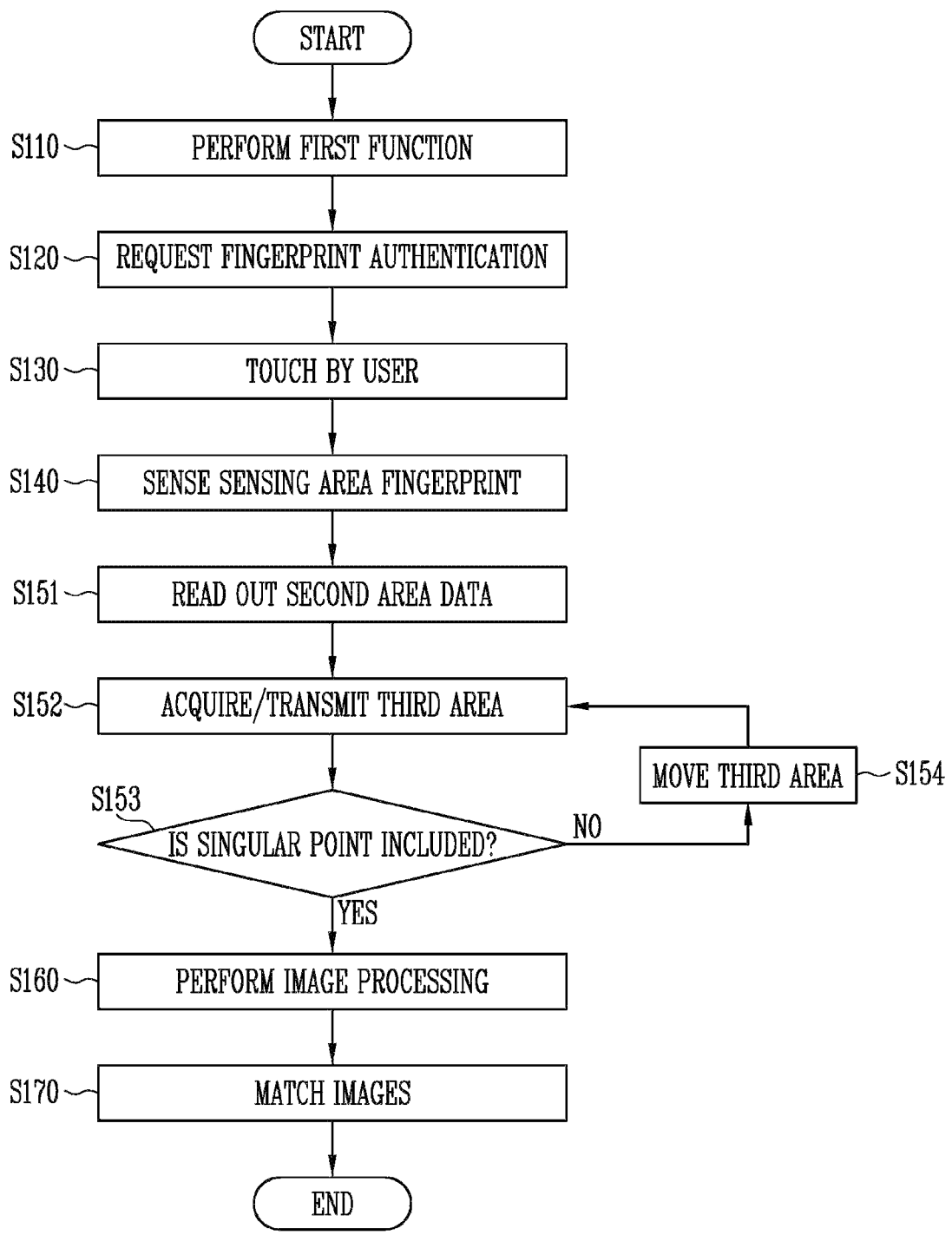
FIG. 11 is a flowchart illustrating a method of driving a display device according to an exemplary embodiment of the present invention.
Figure 12:
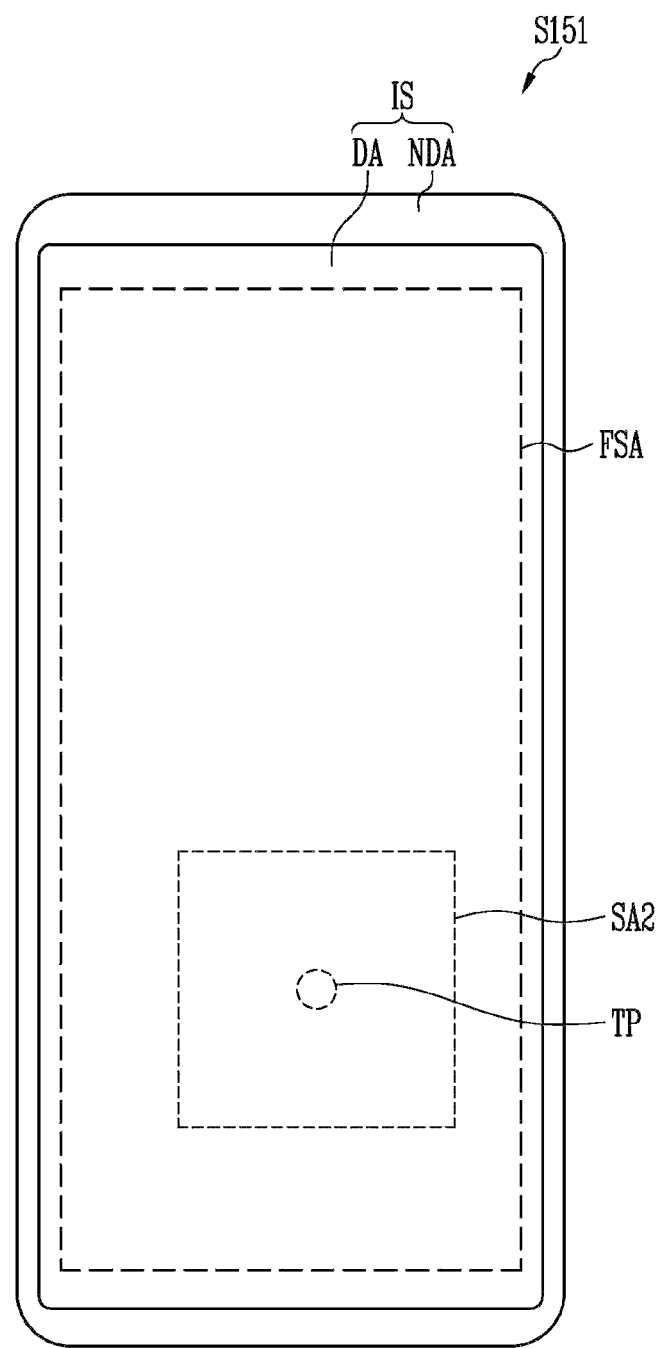
FIG. 12 is a view illustrating a display device to describe the second area data read-out step in FIG. 11, according to an exemplary embodiment of the present invention.
Figure 13:
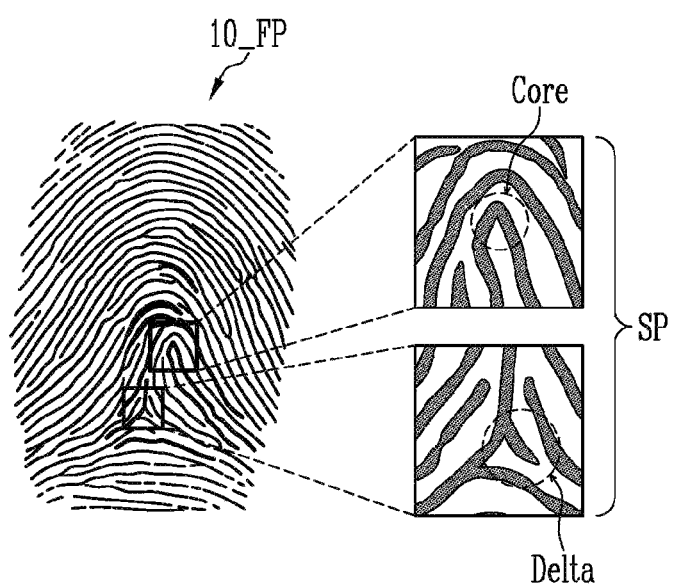
FIG. 13 is a view explaining singular points in a fingerprint of a user, according to an exemplary embodiment of the present invention.
Figure 14:
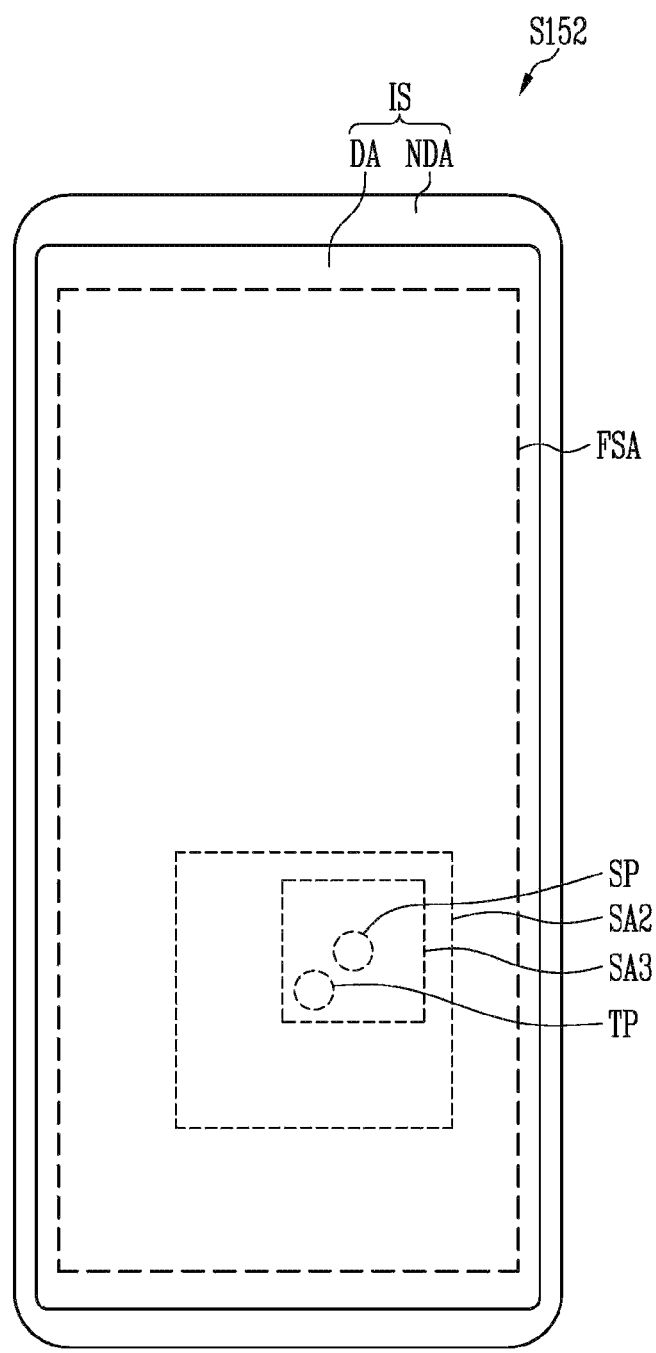
FIG. 14 is a view illustrating a display device to describe the third area acquisition/transmission step in FIG. 11, according to an exemplary embodiment of the present invention.
Figure 15:
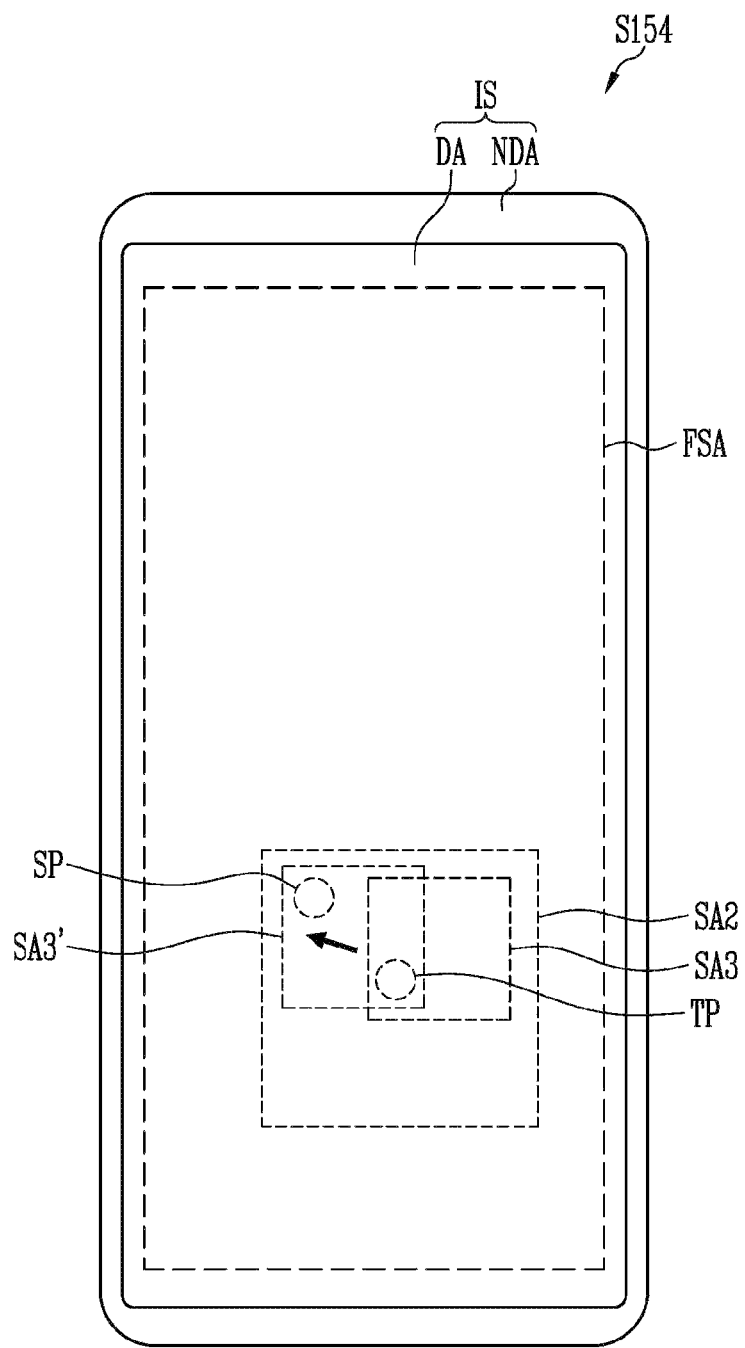
FIG. 15 is a view illustrating a display device to describe the third area acquisition/transmission step in FIG. 11, according to an exemplary embodiment of the present invention.

FIG. 11 is a flowchart illustrating a method of driving a display device according to a further exemplary embodiment of the present inventive concept. FIG. 12 is a view illustrating a display device to describe the second area data read-out step S151 in FIG. 11, according to an exemplary embodiment of the present invention. FIG. 13 is a view explaining singular points in a fingerprint of a user, according to an exemplary embodiment of the present invention. FIG. 14 is a view illustrating a display device to describe the third area acquisition/transmission step in FIG. 11, according to an exemplary embodiment of the present invention. FIG. 15 is a view illustrating a display device to describe the third area acquisition/transmission step in FIG. 11, according to an exemplary embodiment of the present invention.

Referring to FIG. 11, the method of driving a display device according to the present embodiment is different from the embodiment of FIG. 6 in that the first area data read-out step S150 is omitted and a second area data read-out step S151, a third area acquisition/transmission step S152, a singular point inclusion checking step S153, and a third area movement step S154 are further included.

In other words, in an exemplary embodiment of the present invention, the method of driving a display device may include a first function performance step S110, a fingerprint authentication request step S120, a user touch step S130, a sensing area fingerprint sensing step S140, a second area data read-out step S151, a third area acquisition/transmission step S152, a singular point inclusion checking step S153, a third area movement step S154, an image-processing step S160, and a matching step S170.

The fingerprint sensor FS may read out data that is generated based on the sensing signals acquired at the sensing area fingerprint sensing step S140.

Additionally referring to FIG. 12, the second area data read-out step S151 corresponds to the step in which the image sensor 110 generates data based on sensing signals corresponding to a second area SA2, among the sensing signals acquired across the entire sensing area FSA, and reads out the data to be provided to the read-out circuit 120.

The second area SA2 may be set based on a touch point TP where a touch by a user is made. In an exemplary embodiment of the present invention, the second area SA2 may include the touch point TP, and may have a smaller size than the sensing area FSA. According to an exemplary embodiment of the present invention, the second area SA2 may have a smaller size than the sensing area FSA, and may have a size that is equal to or greater than the size of the above-described first area SA1.

The third area acquisition/transmission step S152 corresponds to the step in which the read-out circuit 120 acquires data corresponding to a third area SA3, among data acquired at the second area data read-out step S151, and transmits the data to the first memory 210 or the second memory 220.

For example, referring to FIG. 14, the third area SA3 may be set to an area that is smaller than the second area SA2 and is included in the second area SA2. For example, the third area SA3 may be completely included in the second area SA2. According to an exemplary embodiment of the present invention, the third area SA3 may be the same size as the above-described first area SA1.

At the third area acquisition/transmission step S152, the fingerprint sensor FS may perform analog-to-digital conversion on the sensing signals corresponding to the third area SA3, and may transmit the digital signals, corresponding to the sensing signals of the third area SA3, to the first memory 210 or the second memory 220. The first memory 210 or the second memory 220 may store the digital signals corresponding to the sensing signals of the third area SA3.

Additionally referring to FIG. 13, a user fingerprint 10_FP has a unique feature, and each user fingerprint 10_FP may include various singular points SP. For example, the user fingerprint 10_FP may include singular points SP, such as core and delta, as illustrated. In addition, the user fingerprint 10_FP may further include various singular points SP, such as ridge endings, crossovers, bifurcations, pores, and the like, included in the fingerprint.

Depending on the position of the third area SA3, singular points SP may or may not be included in the sensing signals corresponding to third area SA3. In FIG. 14, an example in which a singular point SP is included in the third area SA3 is illustrated.

The singular point inclusion checking step S153 corresponds to the step in which, based on the data acquired at the third area acquisition/transmission step S152, the read-out circuit 120 or the processor 300 determines whether the data includes a singular point SP of the user fingerprint (or a number of singular points SP equal to or greater than a reference number).

In an exemplary embodiment of the present invention, the display device may determine whether a singular point SP is included using image processing and deep-learning-based artificial intelligence (AI) technology at the singular point inclusion checking step S153. The display device may include a deep-learning algorithm. The deep-learning algorithm may include a deep belief network, an autoencoder, a Convolutional Neural Network (CNN), a Recurrent Neural Network (RNN), a Deep Q-Network, and the like. The deep-learning algorithms enumerated in the present disclosure are merely examples, and thus, the present invention is not limited thereto. Using the deep-learning algorithm, the display device may determine whether a singular point SP is included based on the AI technology trained for singular points SP through a database of the user fingerprint 10_FP. Accordingly, the display device may quickly determine whether a singular point SP is included at the singular point inclusion checking step S153.

At the singular point inclusion checking step S153, when it is determined that the data acquired at the third area acquisition/transmission step S152 includes the above-described singular point SP (or a number of singular points equal to or greater than the reference number), the read-out circuit 120 transmits the data acquired at the third area acquisition/transmission step S152 to the first memory 210 or the second memory 220, and the image-processing step S160 and the matching step S170 may be sequentially performed.

Additionally referring to FIG. 15, at the singular point inclusion checking step S153, when it is determined that the data acquired at the third area acquisition/transmission step S152 does not include the above-described singular point SP (or includes a number of singular points SP less than the reference number), the third area movement step S154 may be performed. In FIG. 15, an example in which the singular point SP is not included in the third area SA3 is illustrated.

The third area movement step S154 corresponds to the step in which the third area SA3 is moved to another area SA3'. For example, the third area SA3 may be moved to another area SA3' in an attempt to capture enough singular points for a subsequent image processing.

Then, the third area acquisition/transmission step S152 and the singular point inclusion checking step S153 may be performed again based on the moved third area SA3'.

At the singular point inclusion checking step S153, when it is determined that the data acquired based on the moved third area SA3' at the third area acquisition/transmission step S152 does not include the above-described singular point SP (or includes a number of singular points SP less than the reference number), the third area movement step S154 is performed again. Conversely, at the singular point inclusion checking step S153, when it is determined that the data acquired at the third area acquisition/transmission step S152 includes the above-described singular point SP (or a number of singular points SP equal to or greater than the reference number), the image-processing step S160 and the matching step S170 may be sequentially performed.

In the present embodiment, because steps from the image-processing step S160 to the matching step S170 are performed using the signals corresponding to the sensing signals of the third area SA3, which is a portion of the sensing area FSA, rather than the entire sensing area FSA, the processor 300 may quickly determine whether authentication succeeds, compared to when the steps S160 and S170 are performed using signals corresponding to the sensing signals of the entire sensing area FSA. Further, because the processor 300 performs fingerprint authentication using singular points SP, security may be increased.

FIG. 16 is a flowchart illustrating a method of driving a display device according to a further exemplary embodiment of the present invention. FIG. 17 is a view illustrating a display device to describe the third area data read-out step in FIG. 16, according to an exemplary embodiment of the present invention.

Referring to FIG. 16, steps S110 to S140 correspond to those described above for FIG. 6. In FIG. 16, the fingerprint sensor FS may read out data that is generated based on the sensing signals acquired at the sensing area fingerprint sensing step S140.

Referring to FIG. 16 and FIG. 17, the third area data read-out step S155 corresponds to the step in which the image sensor 110 generates data based on sensing signals corresponding to a third area SA3 having a singular point SP at the center thereof, among the sensing signals acquired across the entire sensing area FSA, and reads out the data to be provided to the read-out circuit 120. Here, the third area SA3 may be an area set based on the singular point SP, the position of which is determined using image processing and deep-learning-based AI technology.

Subsequently, the image-processing step S160 and the matching step S170 may be sequentially performed. These steps may correspond to those described above for FIG. 6.

In the present embodiment, because steps from the image-processing step S160 to the matching step S170 are performed using the signals corresponding to the sensing signals of the third area SA3, which is a portion of the sensing area FSA, rather than the entire sensing area FSA, the processor 300 may quickly determine whether authentication succeeds, compared to when the steps S160 and S170 are performed using signals corresponding to the sensing signals of the entire sensing area FSA. Further, because the processor 300 performs fingerprint authentication using singular points SP, security may be increased.

FIG. 18 is a flowchart illustrating a method of driving a display device according to an exemplary embodiment of the present invention.

Referring to FIG. 18, in the present embodiment, the method of driving a display device may include a first function performance step S110, a fingerprint authentication request step S120, a user touch step S130, a sensing area fingerprint sensing step S140, a second area data read-out step S151, an image-processing step S160, a singular point coordinate acquisition step S156, an image-cropping step S161, and a matching step S170. Referring to FIG. 18, steps S110-S150 may correspond to those described above for FIG. 6.

After data is generated based on sensing signals corresponding to the second area SA2 and is read out and provided to the read-out circuit unit 120 at the second area data read-out step S151, the image-processing step S160 and the singular point coordinate acquisition step S156 may be respectively performed.

The singular point coordinate acquisition step S156 corresponds to the step in which the coordinates of the singular point SP are acquired based on the data generated based on sensing signals corresponding to the second area SA2. In an exemplary embodiment of the present invention, the display device may use a singular point detection algorithm to acquire the coordinates of the singular point SP. For example, the singular point (SP) detection algorithm is an algorithm configured to divide the image, based on the sensing signals corresponding to the second area SA2, into blocks (e.g., patches) in a lattice form and to generate a unique window coordinate value of each of the blocks.

In an exemplary embodiment of the present invention, the display device may use image processing and deep-learning-based AI technology, which are described above, to acquire the coordinates of the singular point SP.

The image-cropping step S161 corresponds to the step of cropping the image acquired at the image-processing step S160 to fit the area corresponding to the above-described third area SA3 based on the coordinates of the singular point SP calculated at the singular point coordinate acquisition step S156.

The display device may perform the matching step S170 by using the image cropped at the image-cropping step S161 as the input fingerprint image.

According to exemplary embodiments of the present invention, a display device may quickly perform fingerprint authentication, and the security of the display device may be increased.

While the present invention has been described with reference to exemplary embodiments thereof, those skilled in the art will appreciate that various changes in form and details may be made thereto without departing from the spirit and scope of the present invention as set forth in the following claims.

What is claimed is:

1. A display device, comprising:
a display panel including a display area in which an image is displayed;
a fingerprint sensor disposed on a first surface of the display panel, including a sensing area for sensing a fingerprint of a user, and configured to sense the sensing area and to acquire a sensing signal;
a processor configured to authenticate the fingerprint of the user by using data read out from a portion of the sensing area; and
a touch sensor disposed on a second surface of the display panel and including a plurality of sensing electrodes configured to recognize a touch, hovering, gesture and proximity of a finger of the user, wherein
the processor is configured to authenticate the fingerprint of the user by using a sensing data for the portion of the sensing area, wherein
the fingerprint sensor is configured to generate data based on sensing signals corresponding to a first area that is the portion of the sensing area, among sensing signals acquired across the entire sensing area, wherein
the first area includes a touch point where a finger of the user comes into contact with the display panel, and wherein
a size of the first area is smaller than a size of the entire sensing area, wherein the display device is further configured to:
acquire data for a second area that is smaller than the first area and is included in the first area;
determine whether the data acquired for the second area includes a singular point of the fingerprint; and
when it is determined that the data acquired for the second area does not include the singular point, move the second area to a third area to capture the singular point, wherein the third area is smaller than the first area and is included in the first area.

2. The display device according to claim 1, wherein the sensing area is included in the display area.

3. The display device according to claim 2, wherein a size of the sensing area is equal to or greater than 80% of a size of the display area.

4. The display device according to claim 1, wherein the touch sensor is configured to recognize a touch by the user.

5. The display device according to claim 1, wherein the singular point includes a core, a delta, a ridge ending, a crossover, a bifurcation, or a pore.

6. The display device according to claim 1, wherein the display device is further configured to acquire coordinates of the singular point.

7. The display device according to claim 6, wherein the coordinates of the singular point are acquired using artificial intelligence (AI) technology.

8. The display device according to claim 1, further comprising:
a first memory for storing the data of the portion of the sensing area; and
a second memory which stores previously obtained fingerprint information of the user.

9. The display device according to claim 8, further comprising:
a processor configured to match the data stored in the first memory with fingerprint information stored in the second memory.

10. A method of driving a display device, the method comprising:
performing a fingerprint sensing operation by sensing a sensing area contacted by a finger of a user with a fingerprint sensor included in the display device;
generating data, at the fingerprint sensor, and providing the data to a read-out circuit, wherein the data is based on a sensing signal corresponding to a first area that is a portion of the sensing area;

performing a sensing operation with sensing electrodes of a touch sensor to recognize a touch, hovering, gesture and proximity of the finger of the user;

performing an image-processing operation on the data; and performing a matching operation in which an image processed by performing the image-processing operation is compared with a previously stored fingerprint image, wherein the first area includes a touch point where the finger of the user comes into contact, wherein a size of the first area is smaller than a size of the entire sensing area, wherein the method further comprises:

acquiring data for a second area that is smaller than the first area and is included in the first area;

determining whether the data acquired for the second area includes a singular point of the fingerprint of the user; and when it is determined that the data acquired for the second area does not include the singular point, moving the second area to a third area to capture the singular point, wherein the third area is smaller than the first area and is included in the first area.

11. The method according to claim 10, further comprising:

acquiring coordinates of the singular point of the fingerprint of the user; and cropping the image processed by performing the image-processing operation based on the coordinates of the singular point.

12. A display device, comprising:

a display panel including a display area in which an image is displayed;

a fingerprint sensor disposed on the display panel and including a sensing area, wherein the fingerprint sensor is configured to sense a first portion of the sensing area contacted by a finger of a user, acquire sensing signals, and generate data based on the sensing signals corresponding to the first portion of the sensing area, among sensing signals acquired across the entire sensing area;

a processor configured to authenticate a fingerprint of the user by processing an image of the fingerprint of the user and comparing the processed image with a pre-stored fingerprint image; and a touch sensor disposed on a second surface of the display panel and including a plurality of sensing electrodes configured to recognize a touch, hovering, gesture and proximity of the finger of the user, wherein a size of the first portion of the sensing area is smaller than a size of the entire sensing area, and wherein the processor is configured to acquire data for a second area that is smaller than the first area and is included in the first area;

determine whether the data acquired for the second area includes a singular point of the fingerprint; and when it is determined that the data acquired for the second area does not include the singular point, move the second area to a third area to capture the singular point, wherein the third area is smaller than the first area and is included in the first area.

* * * * *